July 22, 1969    A. P. ZASKE    3,456,500
FLUID FLOW TEST EQUIPMENT
Filed Aug. 3, 1966
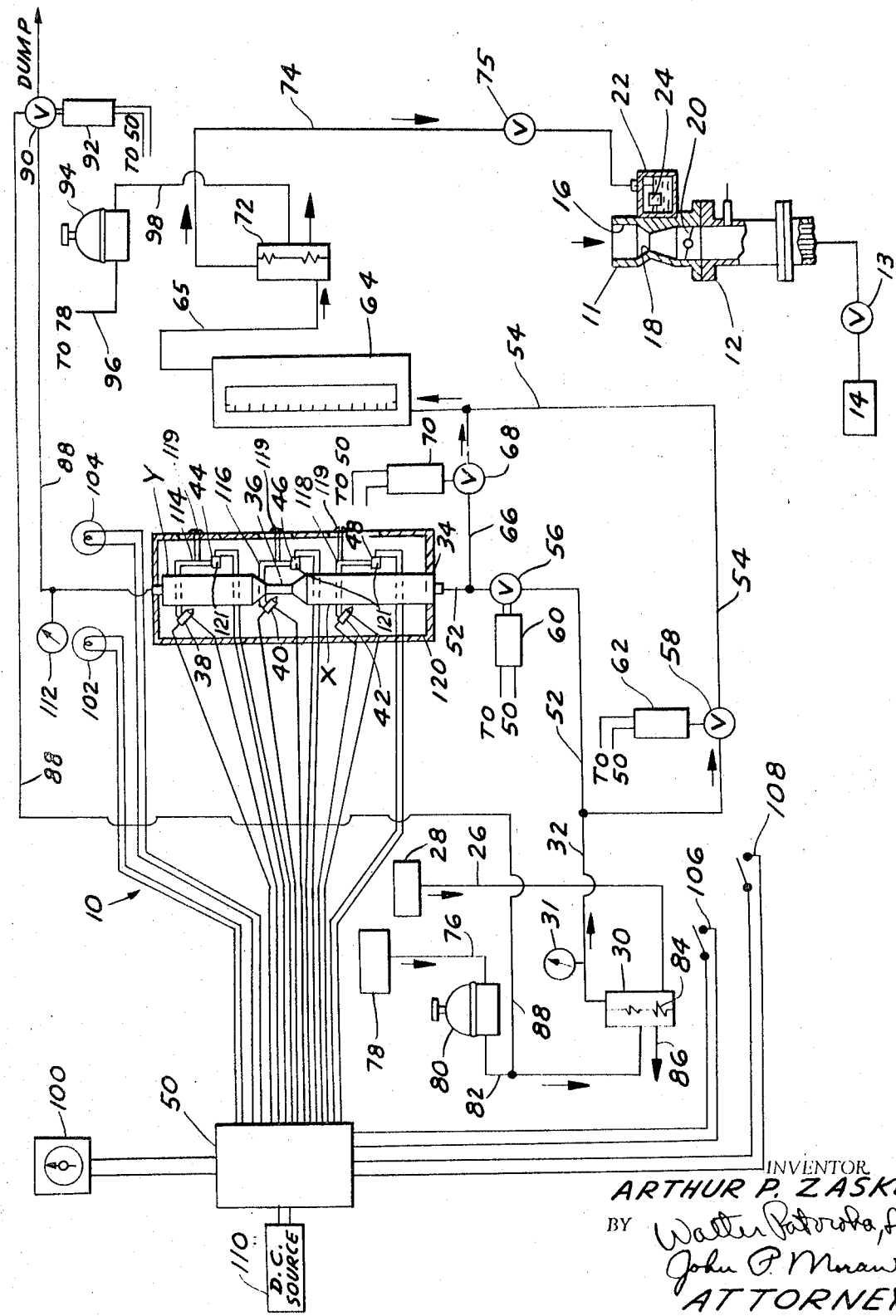
INVENTOR
ARTHUR P. ZASKE
BY Walter Potrovka, Jr.
John P. Moran
ATTORNEYS United States Patent Office 3,456,500
Patented July 22, 1969

3,456,500
FLUID FLOW TEST EQUIPMENT
Arthur P. Zaske, Utica, Mich., assignor to Holley Carburetor Co., Warren, Mich., a corporation of Michigan
Filed Aug. 3, 1966, Ser. No. 569,923
Int. Cl. G01m 19/00, 13/02
U.S. Cl. 73—118                3 Claims

ABSTRACT OF THE DISCLOSURE

Automatic apparatus especially adapted for timing the flow of a predetermined quantity of liquid to a device including, in the preferred embodiment thereof, suitably connected sources of regulated and equalized pressure liquid and air, a burette having one or more photocell liquid level signal means dependent in operation upon light beam refraction by liquid in the burette, the flow of liquid from the burette in one direction being by application of the air pressure, a stoppable and resettable timer controlled by the signal means, solenoid valve controlled conduitry for the liquid and the air, and a suitable source of electrical power, electrical circuitry and switches.

---

This invention relates generally to an apparatus and method for testing carburetors and/or metering liquids, and more particularly to an automatic burette system for comparing idle and off-idle fuel flow rate in production carburetors with that of a master carburetor known to meet fuel flow specifications.

Those skilled in the art are familiar with the prior art carburetor test stand in which fuel flow is measured in lbs. of fuel per hour by the use of a rotameter operating on the principle of a weight lifted by the flow of fuel (or simulated fuel) upwardly past the weight.

Existing and expected laws relating to exhaust emissions from automotive internal combustion engines have resulted in closer limits being placed on the amount of fuel that carburetors for automotive internal combustion engines are permitted to flow during idle and off-idle conditions of operation, and it has been found that the rotameter method of measuring flow is not sufficiently accurate for this purpose, the reasons being pulsing fuel flow and inherent instability of carburetor fuel inlet systems.

Specifications placed on carburetor manufacturers require 100% testing of production carburetors, particularly carburetors to be installed on automotive vehicles destined for States already having exhaust emission control laws, such as California. These so-called "emission carburetors" require precision fuel flow settings.

Each carburetor must meet this fuel flow specification within narrow limits, which creates a need for equipment capable of such testing.

Accordingly, an over-all object of the invention is to provide apparatus capable of measuring precise amounts of liquid.

A more specific object of the invention is to provide carburetor test equipment for determining whether a particular carburetor can be adjusted to and meets idle and off-idle fuel flow specifications.

Another object of the invention is to provide such equipment which is capable of measuring relatively low flow rates within the narrow limits specified.

A further object of the invention is to provide such equipment or apparatus that includes a burette system wherein the time for a known quantity of fuel to flow through the carburetor can be accurately measured due to the amplification of the rate of flow through the burette on a time basis.

A still further object of the invention is to provide such a burette system that is comparably inexpensive, durable, easy to operate and automatic in its operation.

Another object of the invention is to provide such a system that gives an accurate reading of the time required for a predetermined quantity of fuel, as established by upper and lower levels on the burette, to flow through the carburetor being tested, which time can then be compared to the time required for the same quantity of fuel to flow through a master carburetor known to meet fuel flow requirements.

A still further object of the invention is to provide such apparatus wherein the burette has associated therewith extremely fast and accurate light sensitive and electronic means for sensing and indicating or recording time elapsed for flow of the simulated fuel between spaced points on the burette.

Still another object of the invention is to provide simple apparatus which is fast and easy to operate and which automatically resets itself for the next testing cycle.

Another object of the invention is to provide such apparatus that is adjustable so as to permit testing of carburetors having different specified flow rates.

Another object of the invention is to provide such apparatus wherein the presusre of the simulated fuel is regulated and wherein flow of the simulated fuel through the burette is caused by a regulated air pressure above the fuel in the burette.

A still further object of the invention is to provide an apparatus wherein the operator has a minimum number of operations to perform and wherein sequencing of the various steps is automatically controlled so that testing time is reduced to a minimum.

These and others objects and advantages of the invention will become more apparent upon reference to the following specification and the accompanying drawing.

The construction of the apparatus 10 embodying the invention will now be described. Referring to the drawing, the carburetor 11 being tested is shown mounted on a flanged conduit 12 having a valve 13 and leading to a vacuum pump 14 of sufficient capacity to cause any required air flow through the carburetor, as is already well known in the art. The carburetor 11 is, of course, formed in the usual manner with an induction passage 16 having a venturi restriction 18, a pivotal throttle valve 20 below the venturi and a fuel reservoir 22 having the usual float 24 controlling the fuel inlet valve which is not shown.

As is well known in the art, a carburetor supplies fuel to an engine during idle and off-idle operation by reason of a differential between the pressure in the reservoir 22 above the fuel and at the idle and off-idle discharge ports (not shown) disposeed below the throttle valve 20, and the problem is to accuartely adjust such fuel flow in production carburetors so as to match, within prescribed narrow limits, the fuel flow in a previously approved master carburetor, at particular air flow rates through the carburetor as determined by the manifold vacuum simulated by the vacuum pump and the throttle setting.

In the apparatus 10 shown, conduit 26 leading from the source 28 of fuel (or simulated fuel) under pressure supplies fuel to a diaphragm or other suitable type pressure regulator 30 so that fuel under a regulated pressure shown by gauge 31 leaves the regulator 30 through conduit 32.

Before discussing the remainder of the apparatus 10, it should be first explained that one of the main elements of the invention is the glass or other transparent measuring tube or burette 34, which may have any desired configuration, including, for example, the necked-down center portion 36 to increase the flow velocity and thus improve accuracy. The particular burette 34 shown is provided with three lamps or other light sources 38, 40 and 42, each having associated photocells or other light sensitive elements 44, 46 and 48, respectively.

It will be sufficient at this point to merely explain that as the level of the fuel or other liquid drops in the burette and passes by one of the above mentioned light source and photocell assemblies, the light from the source 40, for example, will be refracted through the liquid and directed to the photocell 46, at which time a signal will be transmitted to the socalled "black-box" 50, which contains suitable electronic and/or electrical components and circuits to perform in proper sequence the various electronic or electrical functions that have been and will be described throughout this specification. The specific components and circuits contained in box 50, or its equivalent, have not been shown because persons skilled in that art can design the same in any one of a number of ways not important to this invention.

Getting back now to the system of liquid or fuel flow through the apparatus 10, fuel under the regulated pressure from the regulator 30 flows through conduit 32 into the branch conduits 52 and 54 controlled by solenoid operated valves 56 and 58, respectively the solenoids 60 and 62 being electrically connected to box 50. Conduit 52 controlled by valve 56 leads to the bottom of the burette 34, while conduit 54 controlled by the valve 58 leads to a rotameter 64, bypassing the burette 34. Another conduit 66 between the conduit 52 leading to the burette 34 and the conduit 54 leading to the rotameter 64 is controlled by a valve 68 operated by a solenoid 70 which is again connected to the box 50. From the rotameter 64, fuel flows through conduit 65 into a second diaphragm type or other suitable pressure regulator 72, from which it flows through conduit 74 under a lesser regulated pressure into the carburetor fuel reservoir 22 under the control of the usual valve operated by the float 24. Thus, fuel flowing as described above is admitted to the carburetor float chamber 22 only as required to maintain a constant predetermined level in the fuel chamber 22.

Conduit 76 is connected between any available source 78 of air under pressure and the regulator 80 so that the air coming out of the regulator through conduit 82 is at a regulated pressure, this air being supplied to the opposite side of the diaphragm 84 of the fuel pressure regulator 30 to control the fuel pressure as previously described, the particular regulator 80 being of the type requiring that air be bled from the regulator 30 through a restriction 86. The regulated air from regulator 80 is also supplied through the conduit 88 to the top of the burette 34, the conduit being controlled by a solenoid operated valve 90 so that air may be dumped to atmosphere, the solenoid 92 again being connected to the box 50. Air from the same source 78 is also supplied to a second air pressure regulator 94 through the conduit 96 and is discharged from the regulator 94 through a conduit 98 leading to the second fuel pressure regulator 72, which may be similar to regulator 30.

An electric or other timer 100, a pair of lamps 102 and 104 and a pair of switches 106 and 108 are also each electrically connected to the box 50, which receives power from any suitable source 110, such as a 12-volt battery.

A pressure gauge 112 may be connected to conduit 88 to indicate the pressure therein.

Any suitable means, such as screw and slot means 119, may be employed, preferably in association with the brackets 114, 116 and 118 holding the lamps 38, 40 and 42, and the photocells 44, 46 and 48, respectively, in assembled relation, for adjusting the same along the burette 34, which may be mounted in a suitable housing 120, so as to change the levels or gauge points being read on the burette 34. Since the operator need not observe the liquid level as it passes by the various points along the burette, the housing 120 may be enclosed.

If preferred, the lamps 38, 40 and 42 may be of the type having a lens at the end thereof providing an eliptical beam of light and the photocells 44, 46 and 48 may be formed with horizontal light receiving slots 121 to improve the efficiency of the operation and accuracy thereof.

As already stated, the electric and electronic components, circuitry and connections within the box 50 or other suitable structure is not illustrated and will not be described since any number of specific circuits may be provided to cause the sequence of operation which will now be described.

Operation

For the purposes of this description, it is assumed that the operator has already flowed a master carburetor on the equipment 10 and obtained a rotameter 64 reading (pounds of fuel per hour) and a burette 34 reading (time in seconds). Now the operator has installed a production carburetor 11 on the apparatus 10, and will, for example, check the carburetor for maximum idle fuel flow, with the usual curb idle adjustment needle fully withdrawn, to see if the production carburetor will, or can be adjusted to match the flow through the master carburetor, within the close variation limits allowed.

At this point, the various components of the burette system 10 are in the condition just following a previously completed test cycle, as follows: The top of the fuel column in the burette 34 is at a position corresponding to the light and photocell assembly 38–44. The green light 102 is on, indicating a ready condition and the red light 104 is out. Solenoid valve 58 is open permitting bypass of fuel flow around the burette 34 to the rotameter 64. Solenoid valve 56 is closed, and solenoid valve 68 is also closed. Solenoid valve 90 is open to air pressure from the regulator 80. Air and fuel pressure sources 78 and 28 are both on, meaning that the regulators 30 and 72 are operating, the air regulator 94 providing a regulated air pressure to fuel regulator 72. Box 50 is connected to the power source and electric timer 100 is at a zero position, it being understood that all of the solenoid valves, photocell and light assemblies, bulbs and other electrical equipment are operated through electrical and/or electronic components contained in box 50, which as previously stated, may be of any suitable design and arrangement. The vacuum pump 14 is on so that air is being drawn through the carburetor 11, throttle plate 20 being closed or opened to the desired position and fuel being drawn out of the fuel reservoir 22 and replenished by the conduit 74.

In the ready condition just described, fuel is flowing from the source 28, through the regulator 30, the rotameter 64, the regulator 72 and into the fuel chamber 22 to the extent permitted by the float-controlled fuel inlet valve. A lbs./hr. fuel consumption reading can be taken from the rotameter 64 and compared with the reading previously taken during the run on the master carburetor. If the rotameter reading for the production carburetor is not within allowable limits, any adjustments provided on the carburetor can be made to bring the rotameter reading within these limits, giving a so-called "ball park" setting.

If the rotameter reading is initially acceptable, then, of course, no adjustment need be made at that time. On the other hand, if carburetor adjustment cannot bring the rotameter reading within the limits established from the master run, then the carburetor must be set aside for further checking and a different production carburetor assembled on the unit for testing, in which event the valve 13 in the vacuum pump line may be shut off and the fuel flow shut off by closing the valve 75 in conduit 74.

Assuming now that the rotameter reading is acceptable, or has been made acceptable by adjustment of the carburetor, the operater then proceeds to check the carburetor more accurately by means of the burette system of the apparatus 10.

To begin the automatic operation of the apparatus 10, the operator merely manually actuates burette switch 106, which results in the following sequence of events: Valve 58 closes, valve 68 opens, and the fuel in the burette begins to flow downwardly therethrough to the carburetor 11. The top of the fuel column progresses downwardly past the light and photocell assembly 40–46, at which time the timer 100 is started, and continues to move downwardly to the light and photocell assembly 42–48, at which time the timer 100 is stopped, valve 58 is opened, valve 68 is closed, valve 90 is opened to atmosphere and valve 56 is opened. Since the valve 56 is open, the burette commences to refill from the fuel source 28, the fuel level passing light and photocell assembly 40–46 without anything happening and continuing upwardly to assembly 38–44, at which time valve 90 closes and opens to air pressure from valve regulator 80, valve 56 closes. At this time, red light 104 is energized, reminding the operator to observe and note the elapsed time indicated on the timer 100, this time reading being then compared to time limits established by the master run. The operator then manually actuates the timer reset switch 108 which turns off the red light 104 and readies the system for the next cycle which is accomplished by merely actuating switch 106 again.

If the resulting time was not within the limits established from the master, the production carburetor would be readjusted and the cycle repeated until an acceptable time is obtained, at which time the operator merely proceeds to similarly check another production carburetor.

As previously stated, rotameter systems used in the past have been objectionable because they have an inherent tendency to be unstable, particularly under the fluctuating or shock conditions caused by the float-controlled inlet valve in the fuel bowl. This tends to limit their accuracy, particularly in low fuel flow ranges; furthermore, an excessive amount of time is required, insofar as production testing is concerned, to allow the rotameter to stabilize itself.

The proposed photocell or other automatically read burette system is characterized by amplification of the rate of flow through the burette on a time basis so that the time for obtaining a more accurate reading is reduced, a typical reduction being from about 30 to 15 seconds. The controlled air pressure above the fuel in the burette provides stability in the system and insures a constant pressure despite the loss of head as the level drops in the burette.

It is possible, by providing a fourth lamp and photocell assembly, similar to the assemblies shown in the drawing and located approximately at some point X so as to reduce the quantity of fuel being flowed and by providing suitable circuitry in the box 50, to eliminate the rotameter 64 and obtain the ball park reading in the matter of about 5 seconds.

In addition to more accurate and faster testing, the proposed system is automatic, or semi-automatic, to the extent that the operator has fewer manual functions to perform as compared to prior art systems, which is highly desired.

Specifically, some of the unique and advantageous features of the invention are as follows:

(a) A minimum buretting cycle can be set up with a small percentage of the total cycle being used to allow the fuel level to reach the timing start and negligible time wasted by buretting below the timer stop point.

(b) Automatic resetting of the buretting circuit after the timing cycle.

(c) Locking the timer during the reset cycle.

(d) Regulation of burette air pressure to be identical with the fuel pressure to prevent system shock at the start of the timing cycle. A carburetor inlet system is pressure sensitive and reacts to the buretting system shock.

The use of the invention is not limited to the testing of carburetors, but can be used in any application where it is desirable to measure precise quantities of liquid. Furthermore, while a particular embodiment of the invention has been disclosed and described, by way of example and in such clear and concise terms to enable anyone skilled in the art to practice the same, it is recognized that modifications within the scope of the invention may be made, and no limitations are intended except as recited in the following claims.

What I claim as my invention is:

1. Apparatus for measuring the time required for a predetermined quantity of liquid to flow through a device, said apparatus comprising a source of liquid under pressure; a source of air under pressure; means for regulating and equalizing the pressures of said liquid and said air; a burette having at least three gauge points thereon; a light source and photocell assembly for each of said gauge points; a rotameter; means for mounting said device; a resettable electric timer; a buretting start switch; a timer reset switch; an apparatus ready signal; a timer readout reminder signal; a conduit connecting said liquid source to said device, said conduit having connected parallel branch lines, one connected with the bottom of said burette and the rotameter and the other with the bottom of said rotameter, the top of said rotameter being connected to said device; solenoid operated valves controlling said branch lines whereby said liquid may be directed only to the bottom of said burette, only to said device through said rotameter or only from said burette to said device through said rotameter, as desired; conduits controlled by a solenoid operated valve connecting said air source either with atmosphere or with the top of said burette so as to apply said air pressure above the liquid in said burette; and a direct current electric source and suitable circuitry connecting all of the above-mentioned electrical elements in a manner so as to comprise means for performing the following functions in a sequence listed bleow:

(1) when said buretting switch is closed, said valves in said liquid conduits are positioned so that liquid can flow only from said burette through said rotameter and to said device, the initial liquid level in said burette being at the uppermost of said gauge points;

(2) at the same time, regulated air pressure is supplied above the liquid level in said burette, causing said level in said burette to drop;

(3) as said liquid level in said burette passes the intermediate of said gauge points on said burette, the associated light source and photocell assembly produces a signal causing said timer to start;

(4) when said liquid level reaches the lowermost of said gauge points, its associated light source and photocell assembly creates a signal causing said timer to stop, said air pressure to be dumped to atmosphere, said timer readout reminder signal to be actuated and said liquid conduit valves to assume positions allowing said liquid to flow from said source to said burette and from said source to said device;

(5) when said liquid level reaches its initial level at said uppermost gauge point, its associated light source and photocell assembly creates a signal causing said air pressure to be reapplied to the top of said burette and the burette refilling operation to be stopped;

(6) after reading and recording the elapsed time shown on said timer, actuation of said timer reset switch causes said timer to be reset to zero and said timer readout reminder signal to be inactivated, said apparatus then being ready for noting the rotameter reading, if desired, and a repeat cycle accomplished, as before, by actuating said burette switch.

2. Apparatus such as that recited in claim 1, wherein said device is a carburetor, said means for mounting said device includes means for causing liquid flow through said carburetor and the function of said rotameter is provided with a fourth gauge point and associated light source and photocell assembly, thereby eliminating said rotameter and that portion of said liquid conduit connected thereto.

3. Apparatus for sensing predetermined liquid levels or for timing or dispensing predetermined quantities of liquid to a device, said apparatus comprising a source of liquid under pressure, a source of air under pressure, a conduit between said source of liquid and said device, burette means, a conduit between said source of liquid and said burette, a conduit between said burette and said device, a conduit between said source of air and the top of said burette, said air providing non-gravity means for varying the liquid level in said burette, said latter conduit having a branch opening to atmosphere, means in said air and liquid conduits for regulating and equalizing the pressures of said liquid and said air, valves controlling said liquid and said air conduits, at least two means positioned at spaced predetermined locations along said burette for automatically producing a signal when said liquid level passes said means, said burette comprising a transparent tube and each of said signal means including an assembly of a light source disposed on one side of said tube and a photocell disposed on the opposite side of said tube, each of said assemblies being connected in an electrical circuit, said liquid level varying means including means for applying sufficient regulated gas pressure above said liquid in said tube to cause flow of said liquid in one direction through said tube, a timer for recording the time elapsed for said liquid to flow between said signal means, means in said electrical circuit for starting and stopping said timer as the liquid level passes between said signal means and means in said electrical circuitry for resetting said timer and the liquid level in said burette.

References Cited

UNITED STATES PATENTS

| | | | |
|---|---|---|---|
| 1,737,126 | 11/1929 | Reyling et al. | |
| 2,882,520 | 4/1959 | Hass. | |
| 2,271,144 | 1/1942 | McKay | 73—113 |
| 2,351,027 | 6/1944 | Ewart et al. | 73—118 |
| 2,445,943 | 7/1948 | Edelen | 73—3 X |
| 2,927,461 | 3/1960 | Welch et al. | 73—223 |
| 3,000,207 | 9/1961 | Goffe | 73—223 X |

RICHARD C. QUEISSER, Primary Examiner

JERRY W. MYRACLE, Assistant Examiner

U.S. Cl. X.R.

73—223